United States Patent
Frenkel et al.

(10) Patent No.: US 9,635,037 B2
(45) Date of Patent: Apr. 25, 2017

(54) REMOTE CONTROL OF SECURE INSTALLATIONS

(75) Inventors: Lior Frenkel, Moshav Misgav Dov (IL); Andrew Ginter, Calgary (CA); Tomer Maor, Nes Ziona (IL)

(73) Assignee: WATERFALL SECURITY SOLUTIONS LTD., Rosh HaAyin (IL)

( * ) Notice: Subject to any disclaimer, the term of this patent is extended or adjusted under 35 U.S.C. 154(b) by 208 days.

(21) Appl. No.: 13/604,677

(22) Filed: Sep. 6, 2012

(65) Prior Publication Data

US 2014/0068712 A1    Mar. 6, 2014

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |

(52) U.S. Cl.
CPC ............ *H04L 63/12* (2013.01); *H04L 63/126* (2013.01); *H04L 63/1441* (2013.01)

(58) Field of Classification Search
CPC ....... G06F 21/305; G06F 21/606; G06F 21/64
See application file for complete search history.

(56) References Cited

U.S. PATENT DOCUMENTS

| | | |
|---|---|---|
| 3,377,541 A | 4/1968 | Farkas |
| 4,163,289 A | 7/1979 | Schmidt |
| 4,213,177 A | 7/1980 | Schmidt |
| 4,214,302 A | 7/1980 | Schmidt |
| 4,375,665 A | 3/1983 | Schmidt |
| 4,964,046 A | 10/1990 | Mehrgardt et al. |
| 4,985,919 A | 1/1991 | Naruse et al. |
| 4,987,595 A | 1/1991 | Marino, Jr. et al. |
| 5,140,681 A | 8/1992 | Uchiyama et al. |
| 5,163,138 A | 11/1992 | Thirumalai |
| 5,185,877 A | 2/1993 | Bissett et al. |
| 5,289,478 A | 2/1994 | Barlow et al. |
| 5,530,758 A | 6/1996 | Marino, Jr. et al. |

(Continued)

FOREIGN PATENT DOCUMENTS

| | | |
|---|---|---|
| EP | 1632833 A2 | 3/2006 |
| GB | 2371125 A | 7/2002 |
| WO | 01/63879 A1 | 8/2001 |

OTHER PUBLICATIONS

NPL1 ("Waterfall Technology", Jun. 2009, Applicant's submitted prior art).*

(Continued)

*Primary Examiner* — Harunur Rashid
*Assistant Examiner* — Quy Pham
(74) *Attorney, Agent, or Firm* — D.Kligler IP Services Ltd.

(57) ABSTRACT

Communication apparatus includes a one-way, hardware-actuated data relay, which includes a first hardware interface configured to receive a command from a communications network and a second hardware interface configured to convey the received command to a protected destination when the relay is actuated. A decoder includes a third hardware interface configured to receive a digital signature for the command from the communications network and hardware decoding logic coupled to verify the digital signature and to actuate the relay upon verifying the digital signature, whereby the command is conveyed via the second hardware interface to the protected destination.

10 Claims, 3 Drawing Sheets

(56) References Cited

U.S. PATENT DOCUMENTS

| | | |
|---|---|---|
| 5,548,646 A | 8/1996 | Aziz et al. |
| 5,677,952 A | 10/1997 | Blakley et al. |
| 5,696,822 A | 12/1997 | Nachenberg |
| 5,732,278 A | 3/1998 | Furber et al. |
| 5,748,871 A | 5/1998 | DuLac et al. |
| 5,829,046 A | 10/1998 | Tzelnic et al. |
| 5,835,726 A | 11/1998 | Shwed et al. |
| 5,940,507 A | 8/1999 | Cane et al. |
| 5,946,399 A | 8/1999 | Kitaj et al. |
| 5,995,628 A | 11/1999 | Kitaj et al. |
| 6,023,570 A | 2/2000 | Tang et al. |
| 6,026,502 A | 2/2000 | Wakayama |
| 6,049,611 A | 4/2000 | Tatebayashi et al. |
| 6,167,459 A | 12/2000 | Beardsley et al. |
| 6,170,023 B1 | 1/2001 | Beardsley et al. |
| 6,185,638 B1 | 2/2001 | Beardsley et al. |
| 6,202,095 B1 | 3/2001 | Beardsley et al. |
| 6,239,810 B1 | 5/2001 | Van Hook et al. |
| 6,240,514 B1 | 5/2001 | Inoue et al. |
| 6,289,377 B1 | 9/2001 | Lalwaney et al. |
| 6,317,831 B1 | 11/2001 | King |
| 6,356,546 B1 | 3/2002 | Beshai |
| 6,467,009 B1 | 10/2002 | Winegarden et al. |
| 6,470,449 B1 | 10/2002 | Blandford |
| 6,574,640 B1 | 6/2003 | Stahl |
| 6,601,126 B1 | 7/2003 | Zaidi et al. |
| 6,615,244 B1 | 9/2003 | Singhal |
| 6,640,308 B1 | 10/2003 | Keyghobad et al. |
| 6,643,701 B1 | 11/2003 | Aziz et al. |
| 6,738,388 B1 | 5/2004 | Stevenson et al. |
| 6,754,185 B1 | 6/2004 | Banerjee et al. |
| 6,820,110 B1 | 11/2004 | Engel et al. |
| 6,862,663 B1 | 3/2005 | Bateman |
| 6,915,369 B1 | 7/2005 | Dao et al. |
| 6,915,435 B1 | 7/2005 | Merriam |
| 6,931,549 B1 | 8/2005 | Ananda |
| 6,957,330 B1 | 10/2005 | Hughes |
| 6,963,817 B2 | 11/2005 | Ito et al. |
| 6,966,001 B2 | 11/2005 | Obara et al. |
| 6,970,183 B1 | 11/2005 | Monroe |
| 6,986,061 B1 | 1/2006 | Kunzinger |
| 7,031,322 B1 | 4/2006 | Matsuo |
| 7,062,587 B2 | 6/2006 | Zaidi et al. |
| 7,143,289 B2 | 11/2006 | Denning et al. |
| 7,171,566 B2 | 1/2007 | Durrant |
| 7,200,693 B2 | 4/2007 | Jeddeloh |
| 7,254,663 B2 | 8/2007 | Bartley et al. |
| 7,260,833 B1 | 8/2007 | Schaeffer |
| 7,324,515 B1 | 1/2008 | Chapman |
| 7,366,894 B1 | 4/2008 | Kalimuthu et al. |
| 7,469,311 B1 | 12/2008 | Tsu et al. |
| 7,486,651 B2 | 2/2009 | Hagiwara et al. |
| 7,509,141 B1 | 3/2009 | Koenck et al. |
| 7,631,189 B2 | 12/2009 | Ichinose et al. |
| 7,649,452 B2 | 1/2010 | Zilberstein et al. |
| 7,660,959 B2 | 2/2010 | Asher et al. |
| 7,675,867 B1 | 3/2010 | Mraz et al. |
| 7,685,436 B2 | 3/2010 | Davis et al. |
| 7,685,636 B2 | 3/2010 | Leake et al. |
| 7,698,470 B2 | 4/2010 | Ruckerbauer et al. |
| 7,716,467 B1 | 5/2010 | Deffet et al. |
| 7,757,074 B2 | 7/2010 | Sundarrajan et al. |
| 7,761,529 B2 | 7/2010 | Choubal et al. |
| 7,761,704 B2 | 7/2010 | Ho et al. |
| 7,792,300 B1 | 9/2010 | Caronni |
| 7,814,316 B1 | 10/2010 | Hughes et al. |
| 7,815,548 B2 | 10/2010 | Barre et al. |
| 7,845,011 B2 | 11/2010 | Hirai |
| 7,849,330 B2 | 12/2010 | Osaki |
| 7,941,828 B2 | 5/2011 | Jauer |
| 7,992,209 B1 | 8/2011 | Menoher et al. |
| 8,041,832 B2 | 10/2011 | Hughes et al. |
| 8,046,443 B2 | 10/2011 | Parker et al. |
| 8,223,205 B2 | 7/2012 | Frenkel et al. |
| 2001/0033332 A1 | 10/2001 | Kato et al. |
| 2002/0065775 A1 | 5/2002 | Monaghan |
| 2002/0066018 A1 | 5/2002 | Linnartz |
| 2002/0083120 A1 | 6/2002 | Soltis |
| 2002/0112181 A1 | 8/2002 | Smith |
| 2002/0114453 A1 | 8/2002 | Bartholet et al. |
| 2002/0178370 A1 | 11/2002 | Gurevich et al. |
| 2002/0186839 A1 | 12/2002 | Parker |
| 2002/0191866 A1 | 12/2002 | Tanabe |
| 2002/0199181 A1 | 12/2002 | Allen |
| 2003/0012378 A1 | 1/2003 | Yura |
| 2003/0037247 A1 | 2/2003 | Obara et al. |
| 2003/0039354 A1 | 2/2003 | Kimble et al. |
| 2003/0055792 A1 | 3/2003 | Kinoshita et al. |
| 2003/0061505 A1 | 3/2003 | Sperry et al. |
| 2003/0114204 A1 | 6/2003 | Allen et al. |
| 2003/0140090 A1 | 7/2003 | Rezvani et al. |
| 2003/0140239 A1 | 7/2003 | Kuroiwa et al. |
| 2003/0159029 A1 | 8/2003 | Brown et al. |
| 2003/0177401 A1 | 9/2003 | Arnold et al. |
| 2003/0188102 A1 | 10/2003 | Nagasoe et al. |
| 2003/0200460 A1 | 10/2003 | Morota et al. |
| 2003/0212845 A1 | 11/2003 | Court et al. |
| 2003/0217262 A1 | 11/2003 | Kawai et al. |
| 2004/0022107 A1 | 2/2004 | Zaidi et al. |
| 2004/0070620 A1 | 4/2004 | Fujisawa |
| 2004/0071311 A1 | 4/2004 | Choi et al. |
| 2004/0080615 A1 | 4/2004 | Klein et al. |
| 2004/0175123 A1 | 9/2004 | Lim et al. |
| 2004/0217890 A1 | 11/2004 | Woodward et al. |
| 2004/0247308 A1 | 12/2004 | Kawade |
| 2005/0015624 A1 | 1/2005 | Ginter et al. |
| 2005/0033990 A1 | 2/2005 | Harvey et al. |
| 2005/0060693 A1* | 3/2005 | Robison ............ G06F 9/45512 717/143 |
| 2005/0085964 A1 | 4/2005 | Knapp et al. |
| 2005/0091173 A1 | 4/2005 | Alve |
| 2005/0119967 A1 | 6/2005 | Ishiguro et al. |
| 2005/0120251 A1 | 6/2005 | Fukumori et al. |
| 2005/0122930 A1 | 6/2005 | Zhao et al. |
| 2005/0138369 A1 | 6/2005 | Lebovitz et al. |
| 2005/0165939 A1 | 7/2005 | Nikunen et al. |
| 2005/0216648 A1 | 9/2005 | Jeddeloh |
| 2005/0264415 A1 | 12/2005 | Katz |
| 2005/0270840 A1 | 12/2005 | Kudelski |
| 2006/0026292 A1 | 2/2006 | Namioka et al. |
| 2006/0047887 A1 | 3/2006 | Jeddeloh |
| 2006/0064550 A1 | 3/2006 | Katsuragi et al. |
| 2006/0085354 A1 | 4/2006 | Hirai |
| 2006/0085534 A1 | 4/2006 | Ralston et al. |
| 2006/0095629 A1 | 5/2006 | Gower et al. |
| 2006/0136724 A1 | 6/2006 | Takeshima et al. |
| 2006/0165108 A1 | 7/2006 | Uysal |
| 2006/0165347 A1 | 7/2006 | Mita |
| 2006/0179208 A1 | 8/2006 | Jeddeloh |
| 2006/0195704 A1 | 8/2006 | Cochran et al. |
| 2006/0220903 A1 | 10/2006 | Zigdon et al. |
| 2006/0224848 A1 | 10/2006 | Matulik et al. |
| 2006/0248582 A1 | 11/2006 | Panjwani et al. |
| 2006/0259431 A1 | 11/2006 | Poisner |
| 2006/0271617 A1 | 11/2006 | Hughes et al. |
| 2006/0288010 A1 | 12/2006 | Chen et al. |
| 2006/0294295 A1 | 12/2006 | Fukuzo |
| 2007/0028027 A1 | 2/2007 | Janzen et al. |
| 2007/0028134 A1 | 2/2007 | Gammel et al. |
| 2007/0043769 A1 | 2/2007 | Kasahara et al. |
| 2007/0055814 A1 | 3/2007 | Jeddeloh |
| 2007/0063866 A1 | 3/2007 | Webb |
| 2007/0112681 A1 | 5/2007 | Niwano et al. |
| 2007/0112863 A1 | 5/2007 | Niwata et al. |
| 2007/0174362 A1 | 7/2007 | Pham et al. |
| 2007/0192608 A1 | 8/2007 | De Arruda Villela |
| 2007/0203970 A1 | 8/2007 | Nguyen |
| 2007/0204140 A1 | 8/2007 | Shade |
| 2007/0283297 A1 | 12/2007 | Hein et al. |
| 2008/0005325 A1 | 1/2008 | Wynn et al. |
| 2008/0008207 A1 | 1/2008 | Kellum |
| 2008/0066192 A1 | 3/2008 | Greco et al. |
| 2008/0082835 A1 | 4/2008 | Asher et al. |
| 2008/0155273 A1 | 6/2008 | Conti |

(56) References Cited

U.S. PATENT DOCUMENTS

| | | | |
|---|---|---|---|
| 2008/0244743 | A1 | 10/2008 | Largman et al. |
| 2009/0002150 | A1* | 1/2009 | Zilberstein ......... G05B 23/0208 340/531 |
| 2009/0019325 | A1 | 1/2009 | Miyamoto et al. |
| 2009/0055647 | A1 | 2/2009 | Yu |
| 2009/0113500 | A1* | 4/2009 | Frenkel ................ H04N 5/232 725/109 |
| 2009/0319773 | A1* | 12/2009 | Frenkel ................ G06F 21/50 713/153 |
| 2009/0328183 | A1* | 12/2009 | Frenkel ................ G06F 21/567 726/11 |
| 2010/0275039 | A1 | 10/2010 | Frenkel et al. |
| 2011/0107023 | A1 | 5/2011 | McCallister et al. |
| 2011/0213990 | A1 | 9/2011 | Poisner |
| 2011/0296175 | A1 | 12/2011 | Shin |
| 2012/0268596 | A1 | 10/2012 | Frenkel et al. |
| 2013/0024700 | A1 | 1/2013 | Peterson et al. |
| 2013/0152206 | A1* | 6/2013 | Staubly ................ G06F 21/79 726/26 |
| 2013/0297935 | A1* | 11/2013 | Oswalt ................ H04L 63/123 713/156 |
| 2014/0007194 | A1* | 1/2014 | Tucker ................ H04M 3/567 726/3 |
| 2014/0020109 | A1 | 1/2014 | Mraz et al. |
| 2014/0040679 | A1 | 2/2014 | Shimizu et al. |
| 2014/0122965 | A1 | 5/2014 | Zeng et al. |

OTHER PUBLICATIONS

U.S. Appl. No. 12/438,548 Office Action dated Jul. 11, 2013.
Schneier, B., "Applied Cryptography", Chapter 15, pp. 357-358, published by John Wiley & Sons, Inc, year 1996.
U.S. Appl. No. 13/487,265 Office Action dated Nov. 22, 2013.
U.S. Appl. No. 12/438,548 Office Action dated Feb. 22, 2013.
U.S. Appl. No. 13/487,265 Office Action dated Mar. 6, 2014.
EP Patent Application # 13182696.8 Search Report dated Apr. 3, 2014.
EP Patent Application # 08702651.4 Search report dated May 11, 2012.
Frenkel, L., "Unidirectional Information Transfer", Web issue, Jun. 2005.
U.S. Appl. No. 12/447,470 Official Action dated Sep. 14, 2011.
U.S. Appl. No. 12/447,470 Official Action dated Feb. 9, 2012.
U.S. Appl. No. 12/438,548 Official Action dated Mar. 6, 2012.
U.S. Appl. No. 12/306,692 Official Action dated Feb. 13, 2012.
European Patent Application # 07805530.8 Search report dated Mar. 6, 2012.
IL Patent Application # 177,756 Official Action dated Aug. 17, 2010.
IL Patent Application # 180,748 Official Action dated Oct. 25, 2010.
IL Patent Application # 201473 Official Action dated May 8, 2011.
U.S. Appl. No. 12/447,470 Official Action dated Mar. 25, 2011.
U.S. Appl. No. 11/823,950 Official Action dated Jun. 22, 2009.
U.S. Appl. No. 12/306,692 Official Action dated Sep. 28, 2011.
International Application PCT/IL2008/000886 Search Report dated Nov. 13, 2008.
International Application PCT/IL2008/000070 Search Report dated Jun. 16, 2008.
International Application PCT/IL2007/001070 Search Report dated Jul. 25, 2008.
International Application PCT/IL2006/001499 Search Report dated Apr. 8, 2008.
International Application PCT/IIL2008/001513 Search Report dated Mar. 10, 2009.
Innominate Security Technologies, "Press Release: Innominate joins Industrial Defender Enabled Partner Program", Germany, Apr. 14, 2008 (http://www.innominate.com/content/view/288/120/lang,en/).
Waterfall Security Solutions Ltd., "Waterfall One Way Link Technology", 2008 ( http://www.waterfall-solutions.com/home/Waterfall.sub.--Technology.a-spx).
MSISAC, "Cyber Security Procurement Language for Control Systems", version 1.8, revision 3, Feb. 2008 (http://www.msisac.org/scada/documents/4march08scadaprocure.pdf).
Axis Communications, "Axis Network Cameras", 2008 (http://www.axis.com/products/video/camera/index.htm).
Check Point Software Technologies Ltd., "Extended Unified Threat Management capabilities with new multi-layer messaging security deliver best all-inclusive security solution", USA, Nov. 18, 2008 (http://www.checkpoint.com/press/2008/utm-1-edge-upgrade-111808.html).
Einey, D., "Waterfall IP Surveillance Enabler", Jul. 2007.
U.S. Appl. No. 11/977,391 Official Action dated Jun. 14, 2011.
U.S. Appl. No. 12/447,470 Official Action dated Aug. 30, 2012.
EP Patent Application # 06832267.6 Search Report dated Jun. 3, 2014.
IBM Technical Disclosure Bulletin, Separate Write/Read Logical Paths to Optimize Library Network File System Data Rates, vol. 37, No. 09, pp. 1-3, Sep. 1994.
U.S. Appl. No. 14/248,419 Office Action dated Jul. 25, 2014.
U.S. Appl. No. 12/306,692 Office Action Dated Aug. 12, 2014.
EP Patent Application # 14162141.7 Search Report dated Jun. 3, 2014.
U.S. Appl. No. 13/867,145 Office Action dated Aug. 14, 2015.
IEEE Standards Information Network, "The Authoritative Dictionary of IEEE Terms", IEEE Press, 7th Edition, p. 1154, 2000.
U.S. Appl. No. 13/867,145 Office Action dated Feb. 26, 2016.
U.S. Appl. No. 14/800,708 Office Action dated Mar. 25, 2016.

* cited by examiner

REMOTE CONTROL OF SECURE INSTALLATIONS

FIELD OF THE INVENTION

The present invention relates generally to digital communications and control, and particularly to systems and methods for secure communications.

BACKGROUND

In a computer network handling sensitive data, portions of the network may be connected by one-way data links. The term "one-way link" is used in the context of the present patent application and in the claims to refer to a communication link that is physically configured to carry signals in one direction and to be incapable of carrying signals in the opposite direction. One-way links may be implemented, for example, using Waterfall® systems, which are manufactured by Waterfall Security Solutions, Ltd. (Rosh HaAyin, Israel). The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no physical means of sending any return communications to the transmitting computer.

One-way links may be used to prevent data either from entering or leaving a protected facility. For example, confidential data that must not be accessed from external sites may be stored on a computer that is configured to receive data over a one-way link and has no physical outgoing link over which data might be transmitted to an external site. On the other hand, in some applications, the operator of the protected facility may be prepared to allow data to exit the facility freely via a one-way link, while preventing data from entering the facility in order to thwart hackers and cyber-terrorists.

In this latter category, for example, U.S. Pat. No. 7,649,452, whose disclosure is incorporated herein by reference, describes protection of control networks using a one-way link. As described in this patent, a method for monitoring a process includes receiving a signal from a sensor that is indicative of a physical attribute associated with the process and transmitting data indicative of the received signal over a one-way link. The transmitted data received from the one way link are used in monitoring the process. The method is described in the patent particularly in the context of Supervisory Control And Data Acquisition (SCADA) systems. A SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility.

SUMMARY

Embodiments of the present invention that are described hereinbelow provide apparatus and methods for automatically controlling inputs to a protected destination.

There is therefore provided, in accordance with an embodiment of the present invention, communication apparatus, including a one-way, hardware-actuated data relay, which includes a first hardware interface configured to receive a command from a communications network and a second hardware interface configured to convey the received command to a protected destination when the relay is actuated. A decoder includes a third hardware interface configured to receive a digital signature for the command from the communications network and hardware decoding logic coupled to verify the digital signature and to actuate the relay upon verifying the digital signature, whereby the command is conveyed via the second hardware interface to the protected destination.

In one embodiment, the apparatus includes a one-way link, which is separate from and independent of the one-way relay and is configured to convey output data from the protected destination to the communications network but is physically incapable of conveying input data from the communications network to the protected destination.

In a disclosed embodiment, the protected destination is a utility control station, and the command is configured to control an operating configuration of the station.

In some embodiments, the apparatus includes a transmission station, which includes hardware encoding logic, which is configured to generate the digital signature for the command so as to identify a source of the command. A communications processor is configured to transmit the digital signature over the network to the third hardware interface, and to send the command over the network from the source of the command to the first hardware interface. The hardware encoding logic may be contained in a user authentication unit, which is configured to authenticate an identity of a user of the transmission station before generating the digital signature.

In a disclosed embodiment, the apparatus includes hardware logic, which is coupled between the first and second hardware interfaces so as to receive the command from the first interface, to compare the received command to a set of hardware masks corresponding to permitted commands, and to pass the received command to the second interface only when the received command matches one of the masks.

There is also provided, in accordance with an embodiment of the present invention, communication apparatus, including a first hardware interface configured to receive a command from a communications network and a second hardware interface configured to convey the received command to a protected destination. Hardware logic is coupled between the first and second interfaces so as to receive the command from the first interface, to compare the received command to a set of hardware masks corresponding to permitted commands, and to pass the received command to the second interface only when the received command matches one of the masks.

In a disclosed embodiment, the permitted commands have a predefined data format such that each permitted command consists of a name and a permitted value associated with the name. In one embodiment, the protected destination is a utility control station, and the apparatus includes a monitor, which is coupled to receive the received command from the second interface and to decode the received command from the predefined data format to an inter-control center communications protocol for input to the utility control station. The apparatus may include a transmission station, which is configured to receive an input in accordance with the inter-control center communications protocol from a command source and to encode the input in accordance with the predefined data format for transmission over the network to the first interface.

There is additionally provided, in accordance with an embodiment of the present invention, a method for communication, which includes coupling a one-way, hardware-actuated relay to receive a command from a communications network and to convey the received command to a protected destination when the relay is actuated. A digital signature is received from the communications network and is verified using hardware decoding logic. Upon verifying the digital signature, the relay is actuated, whereby the command is conveyed to the protected destination.

There is further provided, in accordance with an embodiment of the present invention, a method for communication, which includes receiving a command directed to a protected destination from a communications network. The received command is compared to a set of hardware masks corresponding to permitted commands. The received command is passed to the protected destination only when the received command matches one of the hardware masks.

The present invention will be more fully understood from the following detailed description of the embodiments thereof, taken together with the drawings in which:

DETAILED DESCRIPTION OF EMBODIMENTS

Figure 1:
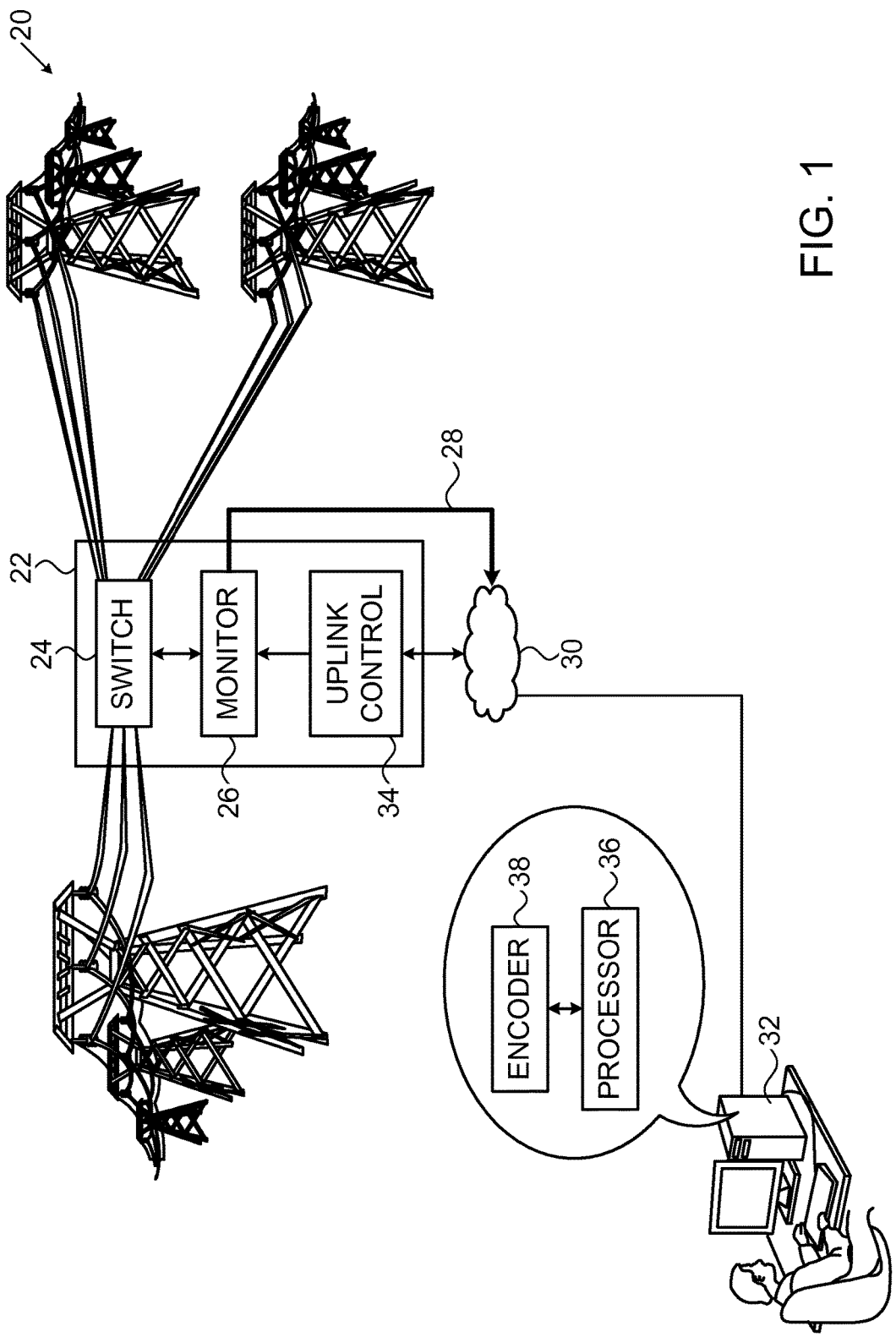
FIG. 1 is a block diagram that schematically illustrates a system for secure monitoring and control, in accordance with an embodiment of the present invention.

Unlike conventional firewalls, one-way links permit information to leave a protected facility without risk to the safety or availability of the network in the facility due to attacks originating on an external network. In practice, however, there is sometimes a need to transmit at least small amounts of information from an external network back into the protected facility.

There are a number of risks associated with such communications. One risk is that if malware has somehow been introduced into the protected network (possibly by insider collaboration), communications back into the protected network could be used to trigger an attack. For example, the malware could cause a computer in the facility to recognize a certain string communicated back into the protected network as a command to initiate some harmful action. Another risk is that an attacker might use the communications channel into the facility to cause unsafe or unreliable conditions in the protected network, by means of a buffer overflow attack, for instance. Such an attack could then be used to introduce remote control malware into the protected network, and provide an attacker with the means to interactively explore and sabotage the protected network.

Embodiments of the present invention that are described hereinbelow address these risks by permitting a controlled flow of small amounts of information into a protected network. The flow is automatically controlled so that software-based attacks on protected equipment become difficult or impossible to carry out, even if parts of the command and communications system themselves become compromised. In contrast to conventional firewalls, the control is carried out by hardware logic, rather than software. Consequently, remote attackers are unable to change the operating configuration of the protection logic or to cause it to perform any function other than those initially programmed by the logic designer. In the disclosed embodiments, the hardware logic is configured to control the format and content of commands that can be sent to a protected destination. The hardware logic may also authenticate these commands to ensure they were produced by an authorized transmitter. As a result, by compromising an authorized transmitter, an attacker may, at worst, be able to send an incorrect command to the destination, but will not be able to gain control over the protected facility.

Some embodiments of the present invention use the concept of a data relay—hardware that accepts and holds a set of digital input commands that are sent from a set of source hardware interfaces and directed to destination computer hardware, network(s) or CPU(s). When the relay is triggered, the inputs are transferred to the outputs of the data relay and so are made available to destination hardware interfaces of the destination computer hardware, CPU(s) or network(s). An optional authentication hardware component, such as a digital signature decoder, can be configured to trigger the data relay when authentication information, such as a digital signature, is found to match the digital input commands in the holding area of the data relay. An optional filtering hardware component, which may be part of the data relay, allows movement of the commands from the input interfaces to output interfaces if and only if the commands match a hardware mask or whitelist of allowed commands.

As noted earlier, data relays of this sort can be particularly useful in conjunction with one-way links, for example in situations in which information is allowed to flow freely out of a facility via a one-way link, while the flow of commands into the facility is strictly controlled. The principles of such data relays and secure communication proxies that are described herein, however, are by no means limited to this sort of operating environment and may be used with or without a one-way link, depending on system and application requirements.

FIG. 1 is a block diagram that schematically illustrates a system 20 for secure monitoring and control, in accordance with an embodiment of the present invention. In this example, system 20 is used to monitor and control an industrial control system in a utility control station 22, such as a transmission and switching station of an electric power utility. Although for the sake of simplicity, only a single station 22 is shown in FIG. 1, in practice utilities generally operate many such stations. Station 22 typically comprises operational elements, such as switches 24, which make and break power connections. In many actual systems, stations 22 are unmanned, and switches 24 are controlled remotely by command transmission stations, such as a control terminal 32, for example.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over commands that may be input to a protected destination. Station 22 is just one example of such a destination, which is presented here for the sake of clarity of explanation. Certain embodiments of the present invention are described hereinbelow, for the sake of clarity and without limitation, with respect to the elements of system 20, but the principles of these embodiments and the techniques that they incorporate may similarly be applied in other operating environments in which a destination is to be protected from undesired data input and unauthorized access.

Station 22 is typically designed as a closed, secure facility, protected physically against unauthorized entry. A monitor 26 in station 22 inputs commands to switches 24 and monitors the operation of the switches and other components of the station. Typically, monitor 26 comprises multiple sensors and actuators, which are distributed throughout station 22 and report via a secure internal network to a controller (not shown), as described, for example, in the above-mentioned U.S. Pat. No. 7,649,452. Monitor 26 outputs data collected from the sensors and actuators via a one-way link 28 to a network 30, which conveys the data to a terminal 32. Network 30 may comprise any suitable wired or wireless network, or a combination of such networks, including public networks, such as the Internet.

One-way link 28 conveys output data from station 22 to network 30 but is physically incapable of conveying input data from the network to the station. For this latter purpose, station 22 comprises an uplink controller 34, which typically has an interface coupled to network 30 and another interface to the protected elements of the station. In this example, controller 34 inputs commands to monitor 26, which then actuates switches 24 to carry out the commands. Uplink controller 34 comprises hardware logic, which authenticates the commands that are input to monitor 26 and limits the times, quantities, and/or content of these commands, as described further hereinbelow. Monitor 26 receives no inputs from network other than via uplink controller 34, which is typically contained in station 22 and is thus itself protected from physical and electrical tampering.

Commands initiated by an operator of terminal 32 (or possibly initiated autonomously by the terminal itself) are formatted by a processor 36, which typically comprises a general-purpose computer processor running standard software. The commands may be formulated in accordance with a standard protocol, such as the inter-control center communications protocol (ICCP), as is known in the art. A secure encoder 38 operates in conjunction with processor 36 so as to transmit inputs to uplink controller 34 in the proper, authenticated form. Typically (although not necessarily), encoder 38 also comprises hardware logic, to prevent an attacker from mimicking or gaining control over the encoding functions. Even if an attacker does gain control over encoder 38, however, the damage he or she will be able to do to station 22 will generally be limited to inputting incorrect commands (such as improper settings of switches 24), as other commands are blocked by the protective logic in uplink controller 34.

Figure 2:
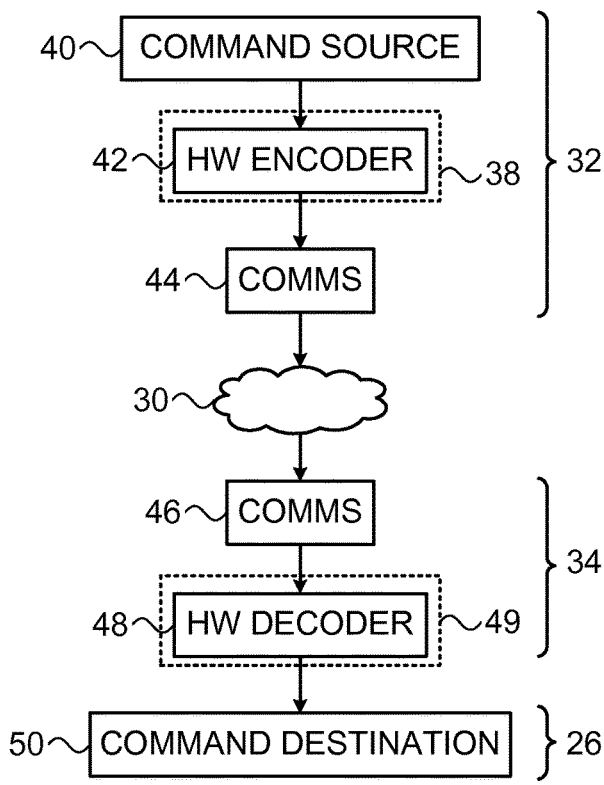
FIG. 2 is a block diagram that schematically shows functional elements of a system for secure control of a protected destination, in accordance with an embodiment of the present invention.

FIG. 2 is a block diagram that schematically shows functional elements of system 20, in accordance with an embodiment of the present invention. In this embodiment, terminal 32 comprises a command source 40, typically in the form of software running on processor 36, which generates a command input in a conventional format (such as ICCP) or any suitable proprietary format. A hardware encoder 42, which may be embodied in encoder 38, encodes the command input in accordance with a predefined data format that is supported by uplink controller 34. This format defines a syntax of permitted commands, and may specify, for example, that each permitted command consists of a parameter name and a value associated with the name. The names and values are selected from limited, predefined lists of permitted names and values. Command inputs from source 40 that can be expressed in this way are accepted and encoded by encoder 42, whereas commands attempting to invoke other functions within station 22, even if legally composed in the conventional command format, may be rejected. Typically, hardware encoder 42 is implemented in hard-wired or programmable logic and does not include any software-driven components, such as a central processing unit (CPU). The hardware encoder may encode the commands using strong encryption and cryptographic authentication techniques, so that uplink controller 34 can distinguish commands coming from an authentic source from other commands and attacks.

A communication interface 44 in terminal 32 generates a communication stream containing the encoded command for transmission over network 30 to station. Interface 44 may, for example, establish a secure connection (such as a Transport Layer Security [TLS] encrypted connection, as is known in the art) with a corresponding communication interface 46 of uplink controller 34. This sort of conventional data security measure adds a further layer of protection to the operation of the dedicated hardware logic.

Communication interface 46 passes commands that it receives to hardware decoding logic 48, which like encoder 42 typically contains no CPU or other software-driven components. Like encoder 42, decoder 48 may be part of a larger hardware/software decoder unit 49. Logic 48 may authenticate received commands, and accept only authentic commands. Logic 48 decodes accepted commands and compares each such command to a set of predefined hardware masks corresponding to permitted commands (such as permitted couples of names and values, as described above). Commands that match one of the masks are passed through to a command destination 50, such as monitor 26. Assuming monitor 26 comprises standard components, decoder unit 49 may decode these commands back into a conventional format, such as ICCP, to which these components are programmed to respond. Decoder 48 rejects commands that do not match any of the predefined hardware masks. As a result, only commands that invoke certain predefined, permitted actions in station 22 will reach monitor 26, while malformed or otherwise dangerous commands that could be used to mount an attack are blocked.

Figure 3:
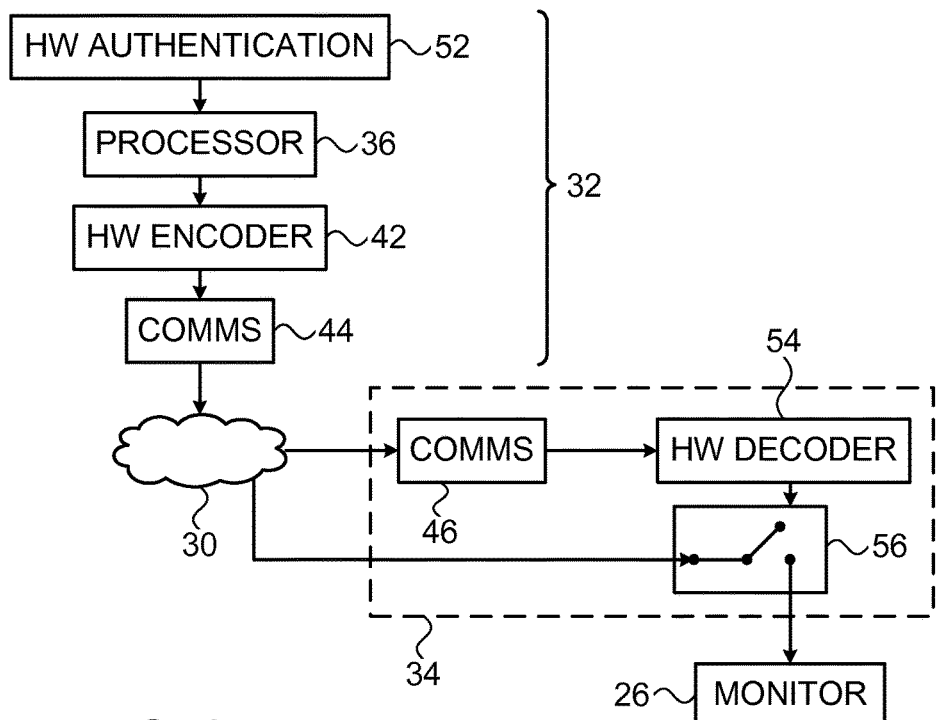
FIG. 3 is a block diagram that schematically shows functional elements of a system for secure control of a protected destination, in accordance with another embodiment of the present invention.

FIG. 3 is a block diagram that schematically shows functional elements of system 20, in accordance with another embodiment of the present invention. This embodiment may be used either together with or independently of the embodiment of FIG. 2, depending on security needs. In this embodiment, terminal 32 comprises a hardware authentication unit 52, which may be comprised (functionally and/or physically) in encoder 38. Unit 52 comprises hardware encoding logic, which generates a digital signature so as to identify the source of commands. The digital signature may be generated, for example, using methods of asymmetric encryption that are known in the art, or using any other suitable technique. Processor 36 generates commands to station 22, and communication interface 44 transmits these commands together with the digital signature over network 30 to station 22.

Authentication unit 52 may comprise a plug-in user authentication unit, which generates the digital signature only after authenticating the identity of the operator of terminal 32 who is inputting the commands. For this purpose, unit 52 may comprise, for example, a secure memory with a secret key and encryption circuits for generating the digital signature, as is known in the art. For enhanced security, unit 52 may comprise a keypad for input of a password by the user and/or a biometric identification device, such as a fingerprint reader. Additionally or alternatively, unit 52 may include a timestamp and/or sequence number in the signatures that it generates in order to foil replay attacks.

Uplink controller 34 has two interfaces to network 30: communication interface 46, which receives the digital signatures generated by authentication unit 52, and an input interface to a one-way, hardware-actuated relay 56, which receives the commands generated by processor 36. The two interfaces may be separate physical interfaces or simply separate ports on a single physical interface. Interface 46 passes the digital signatures to a decoder 54, comprising hardware decoding logic, which verifies the digital signature. Upon verifying that the signature is correct and authentic, decoder 54 actuates relay 56, so that the command sent by processor 36 is conveyed through the relay to monitor 26.

In this manner, the command input to monitor 26 is open for only short, controlled periods of time. All transmissions outside these periods (whether from terminal 32 or other sources) are blocked. Because decoder 54 and relay 56 are implemented in hardware, which is located inside the protected environment of station 22, it is essentially impossible to bypass their blocking functionality by means of a software attack. The time periods during which relay 56 is actuated may be short (typically less than 10 sec, and possibly less than sec, for instance), and the amount of data permitted through each time the relay opens may be restricted to a certain number of bytes. Consequently, even if an attacker is able to gain control of authentication unit 52, his or her ability to interact through uplink controller 34 with other elements of station 22 will still be very limited. The switching functions of decoder 54 and relay 56 may be combined with the masking function of the embodiment of FIG. 2 for still greater security.

Figure 4:
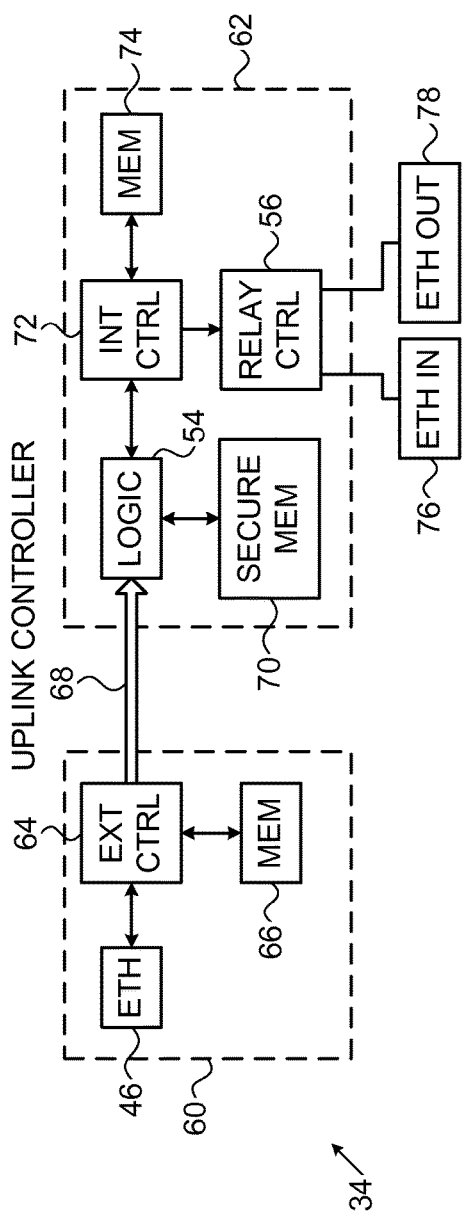
FIG. 4 is a block diagram showing details of a secure uplink controller, in accordance with an embodiment of the present invention.

FIG. 4 is a block diagram that schematically shows details of uplink controller 34, in accordance with an embodiment of the present invention. In this implementation, the uplink controller comprises an open portion 60 and a secure, tamper-proof portion 62. Communication interface 46, which comprises a suitable hardware component such as an Ethernet interface, receives and passes incoming data packets from network 30 to an external (unsecured) microcontroller 64, such as an ARMS processing unit with a memory 66 for initial processing. Microcontroller 64 passes the digital signatures via a one-way link 68 to hardware decoding logic 54. Logic 54 may comprise a gate array or ASIC chip, which is programmed to decode and verify the digital signatures using keys and other secret data stored in a secure memory 70.

Upon successfully verifying an incoming digital signature, logic 54 signals a secure, internal microcontroller 72, which may similarly comprise an ARM9 processing unit with a memory 74. Microcontroller 72 instructs relay control logic 56 to open a one-way data relay from an input interface 76, which is connected to network 30, to an output interface 78, which is connected to monitor 26. Like interface 46, interfaces 76 and 78 comprise suitable hardware components, such as Ethernet interfaces, although other communication standards may similarly be supported.

Figure 5:
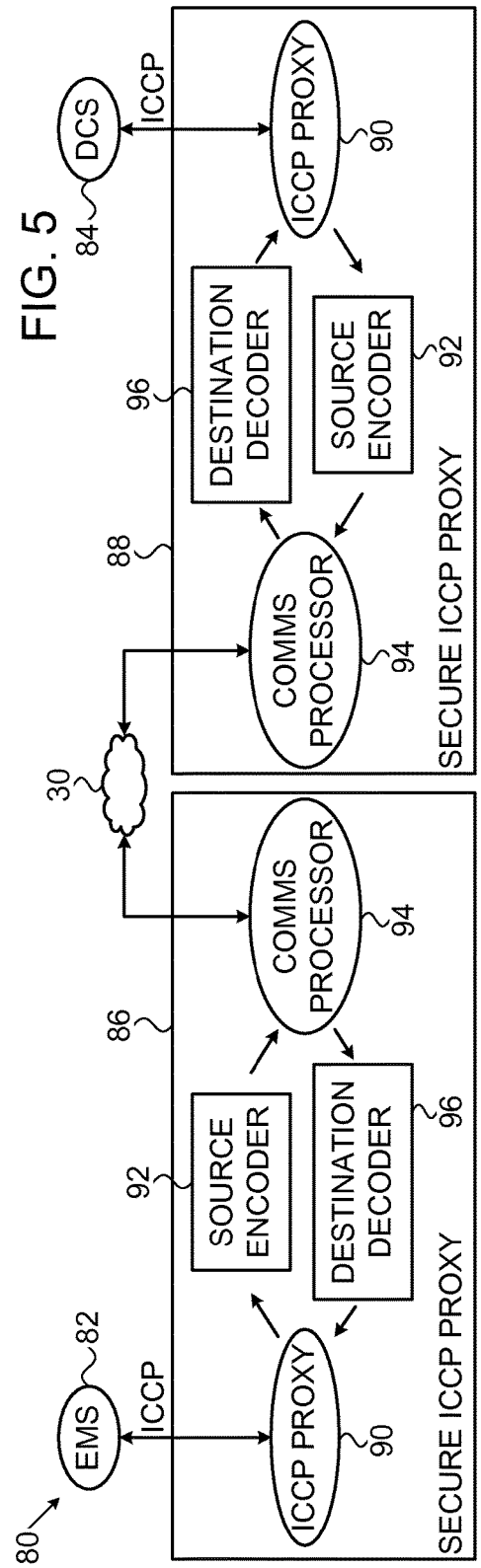
FIG. 5 is a block diagram that schematically illustrates a secure proxy-based communication system, in accordance with an embodiment of the present invention.

FIG. 5 is a block diagram that schematically illustrates a secure proxy-based communication system 80, in accordance with another embodiment of the present invention. In this example, secure ICCP proxies 86 and 88 support a peer-to-peer, secure communications session between an Energy Management System (EMS) 82 in a control center and a Distributed Control System (DCS) 84, which controls an electrical generator. A conventional connection between EMS 82 and DCS 84 would use ICCP through either a trusted, dedicated communications network or through a Virtual Private Network (VPN) traversing an untrusted network. The illustrated configuration allows both the EMS and the DCS to maintain this conventional ICCP communication model. Secure ICCP proxies 86 and 88 convert these conventional communications into a pair of secure command channels in a manner that is transparent to the EMS and DCS. Proxies 86 and 88 transmit information through untrusted network 30, such as the public Internet, without risk of an attack from the network compromising either the EMS or DCS, or of an attack from a compromised EMS or DCS propagating through the ICCP connection to compromise the peer DCS or EMS.

In the embodiment of FIG. 5, each secure ICCP proxy 86, 88 is both a source and a destination of a secure command channel. In secure ICCP proxy 86, for example, an ICCP proxy processor 90 receives commands sent by EMS 82, and converts them into the secure sort of name:value syntax described above. A source encoder 92 encodes the converted commands, typically using hardware-implemented encoding logic as described above, and a communications processor 94 thus sends the commands securely over network 30 to the communications processor of proxy 88. A destination decoder 96 in proxy 88 decodes the commands, typically using hardware-implemented decoding logic, and ICCP proxy processor 90 in proxy 88 converts them back into the standard ICCP format for delivery to DCS 84, as though the EMS had communicated them directly to the DCS.

In similar fashion, secure ICCP proxy 88 receives ICCP data reports from DCS 84 and converts and encodes the reports for transmission to proxy 86. Proxy 86 decodes and converts the data back into ICCP format and passes the data to EMS 82, as though the DCS had communicated the reports directly to the EMS using ICCP.

The configuration shown in FIG. 5 can similarly be adapted for use in other communication scenarios and with other protocols. For example, this same sort of configuration can protect EMS-to-substation communications using the DNP3 Distributed Network Protocol, by substituting DNP3 for ICCP in the above description and substituting a substation remote terminal unit (RTU) for the DCS. Other applications will be apparent to those skilled in the art and are considered to be within the scope of the present invention.

It thus will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
   a transmission station, which comprises:
   a processor running software which generates commands in a predetermined command format, responsive to input from a user;
   hardware encoding logic configured to receive commands in the predetermined command format from the software running on the processor, to convert the received commands into a predefined converted data format of permitted commands including only a limited subset of the commands in the predetermined command format and to cryptographically sign the converted commands in the predefined converted data format; and a communications processor configured to transmit the cryptographically signed converted commands over a communications network, and an uplink controller, comprising:

a first hardware interface configured to receive commands from the transmission station over the communications network;

a second hardware interface configured to convey the received commands to a protected destination;

hardware logic, which is coupled between the first and second interfaces so as to receive commands from the first interface, to authenticate that the received commands were cryptographically signed by the transmission station, to compare the received commands to a set of hardware masks corresponding to the permitted commands to check the commands are in the predefined converted data format, and to pass to the second interface only received commands that were authenticated as received from the transmission station and match one of the masks, while rejecting commands in the predetermined command format;

a first one-way link connecting the first hardware interface to the hardware logic, allowing data from the first hardware interface to the hardware logic, but incapable of carrying data from the hardware logic to the first hardware interface; and a second one-way link separate from and independent of the hardware logic, connecting the protected destination to the communication network in a manner allowing information to flow freely out of the protected destination to the communication network, without passing through the hardware logic, wherein the one-way link is incapable of carrying data from the communication network to the protected destination, wherein the hardware encoding logic comprises dedicated hardware logic not containing a CPU and is designed to perform a task which cannot be changed remotely, wherein the hardware logic of the uplink controller comprises dedicated hardware logic not containing a CPU and is designed to perform a task which cannot be changed remotely, wherein the protected destination is an industrial control system, and wherein the permitted commands are configured to control an operating configuration of the industrial control system, and wherein the hardware encoding logic of the transmission station is configured to encrypt the commands it receives and the hardware logic of the uplink controller is configured to decrypt the received commands.

2. The apparatus according to claim 1, wherein the hardware encoding logic is contained in a user authentication unit, which is configured to authenticate an identity of a user of the transmission station before converting the commands into the predefined data format.

3. The communication apparatus according to claim 1, wherein the permitted commands of the predefined converted data format are defined by stating a name of the command and defining permitted and non-permitted values associated with the name.

4. The communication apparatus according to claim 1, wherein the permitted commands have a predefined converted data format, and wherein the protected destination is a utility control station, and wherein the apparatus comprises a monitor, which is coupled to receive the received command from the second interface and to decode the received command from the predefined converted data format to an inter-control center communications protocol for input to the utility control station.

5. The communication apparatus according to claim 4, wherein the transmission station is configured to receive an input in accordance with the inter-control center communications protocol from a command source and to encode the input in accordance with the predefined converted data format for transmission over the network to the first interface.

6. The communication apparatus according to claim 1, wherein the hardware encoding logic of the transmission station and the hardware logic of the uplink controller comprise hardware logic not driven by software.

7. A method for communication, comprising:

receiving an instruction to generate a command directed to a protected destination, from a user, by a transmission station;

generating a command in a predetermined command format, responsive to the instruction from the user, by software running on a processor;

converting the generated command into a predefined converted data format of permitted commands including only a limited subset of the commands in the predetermined command format, by hardware encoding logic containing no CPU, designed in dedicated hardware logic to perform a task which cannot be changed remotely, wherein converting the generated command into a predefined converted data format comprises encrypting the command;

cryptographically signing the converted commands in the predefined converted data format;

transmitting the cryptographically signed converted command over a communications network to an uplink controller;

receiving the converted command by the uplink controller;

transferring the received converted command to a hardware logic of the uplink controller through a first one-way link incapable of carrying data back from the hardware logic;

decrypting the received converted command by the hardware logic of the uplink controller, wherein the hardware logic of the uplink controller comprises dedicated hardware logic not containing a CPU and is designed to perform a task which cannot be changed remotely;

authenticating that the received commands were cryptographically signed by the transmission station;

comparing the received command to a set of hardware masks corresponding to the permitted commands, by the hardware logic of the uplink controller;

passing the received command to the protected destination only when the received command matches one of the hardware masks and was authenticated as received from the transmission station, while rejecting commands in the predetermined command format; and conveying output data from the protected destination to the communications network over a second one-way link, which is separate from and independent of the hardware logic and is physically incapable of conveying input data from the communications network to the protected destination, wherein the protected destination is an industrial control system, wherein the permitted commands are configured to control an operating configuration of the industrial control system.

8. The method according to claim 7, wherein comparing the received command to a set of hardware masks corresponding to permitted commands comprises comparing the received command to a set of masks which have a predefined converted data format such that each permitted command in the set is defined by a name of the command and permitted values associated with the name.

9. The method according to claim 7 wherein the protected destination is a utility control station, and wherein the method comprises decoding the received command from the predefined converted data format to an inter-control center communications protocol for input to the utility control station.

10. The method according to claim 9, wherein receiving the command comprises receiving a command in accordance with the inter-control center communications protocol.

* * * * *